(12) United States Patent

Williamson

(10) Patent No.:    US 12,571,645 B2

(45) Date of Patent:    Mar. 10, 2026

(54) METHOD, APPARATUS, AND COMPUTER PROGRAM PRODUCT FOR SENSOR DATA ANALYSIS

(71) Applicant: HERE GLOBAL B.V., Eindhoven (NL)

(72) Inventor: Dennis Scott Williamson, Wheaton, IL (US)

(73) Assignee: HERE GLOBAL B.V., Eindhoven (NL)

( * ) Notice: Subject to any disclaimer, the term of this patent is extended or adjusted under 35 U.S.C. 154(b) by 195 days.

(21) Appl. No.: 18/053,073

(22) Filed: Nov. 7, 2022

(65) Prior Publication Data

US 2024/0151549 A1    May 9, 2024

(51) Int. Cl.
*G01C 21/00*          (2006.01)
*B60W 60/00*         (2020.01)

(52) U.S. Cl.
CPC ..... *G01C 21/3804* (2020.08); *G01C 21/3833* (2020.08); *B60W 60/001* (2020.02); *B60W 2556/40* (2020.02)

(58) Field of Classification Search
CPC ........... G01C 21/3804; G01C 21/3833; B60W 60/001; B60W 2556/40; B60W 2556/45
See application file for complete search history.

(56)              References Cited

U.S. PATENT DOCUMENTS

| | | | |
|---|---|---|---|
| 10,657,804 B2 | 5/2020 | Giurgiu et al. | |
| 2017/0030730 A1 | 2/2017 | Boschker et al. | |
| 2019/0147331 A1* | 5/2019 | Arditi | G06N 3/08 |
| 2020/0400441 A1* | 12/2020 | Efland | G01C 21/32 |
| 2021/0004363 A1* | 1/2021 | Bailly | G06F 16/235 |
| 2022/0057230 A1* | 2/2022 | Pohl | G01C 21/3841 |
| 2022/0155098 A1* | 5/2022 | Liu | G01C 21/3841 |
| 2022/0170750 A1 | 6/2022 | Li et al. | |
| 2023/0350064 A1* | 11/2023 | Hu | G01S 17/89 |
| 2023/0417572 A1* | 12/2023 | Donderici | G01C 21/3822 |
| 2024/0159562 A1* | 5/2024 | Abe | G01C 21/387 |

FOREIGN PATENT DOCUMENTS

| | | |
|---|---|---|
| JP | 2009037062 A | 2/2009 |
| WO | WO 2020/207006 A1 | 10/2020 |

* cited by examiner

*Primary Examiner* — Ramya P Burgess
*Assistant Examiner* — Brittany Renee Peko
(74) *Attorney, Agent, or Firm* — ALSTON & BIRD LLP

(57)              ABSTRACT

A method is provided for using sensor data that is consistent with the model to verify the model, and using sensor data that is different from the model to identify regions of the model requiring updates. Methods include: receiving observation data associated with a geographic area; comparing the observation data with a model of the geographic area; in response to the observation data failing to correspond to the model of the geographic area, identifying the observation data as novel data; in response to the observation data corresponding to the model of the geographic area, identifying the observation data as same data; using the novel data to update a map of a map database to form an updated map; and for observation data identified as same data, maintaining the map of the map database without using the same data to update the map.

20 Claims, 5 Drawing Sheets

APPARATUS 200

COMMUNICATIONS INTERFACE 206

PROCESSOR 202

USER INTERFACE 208

MEMORY 204

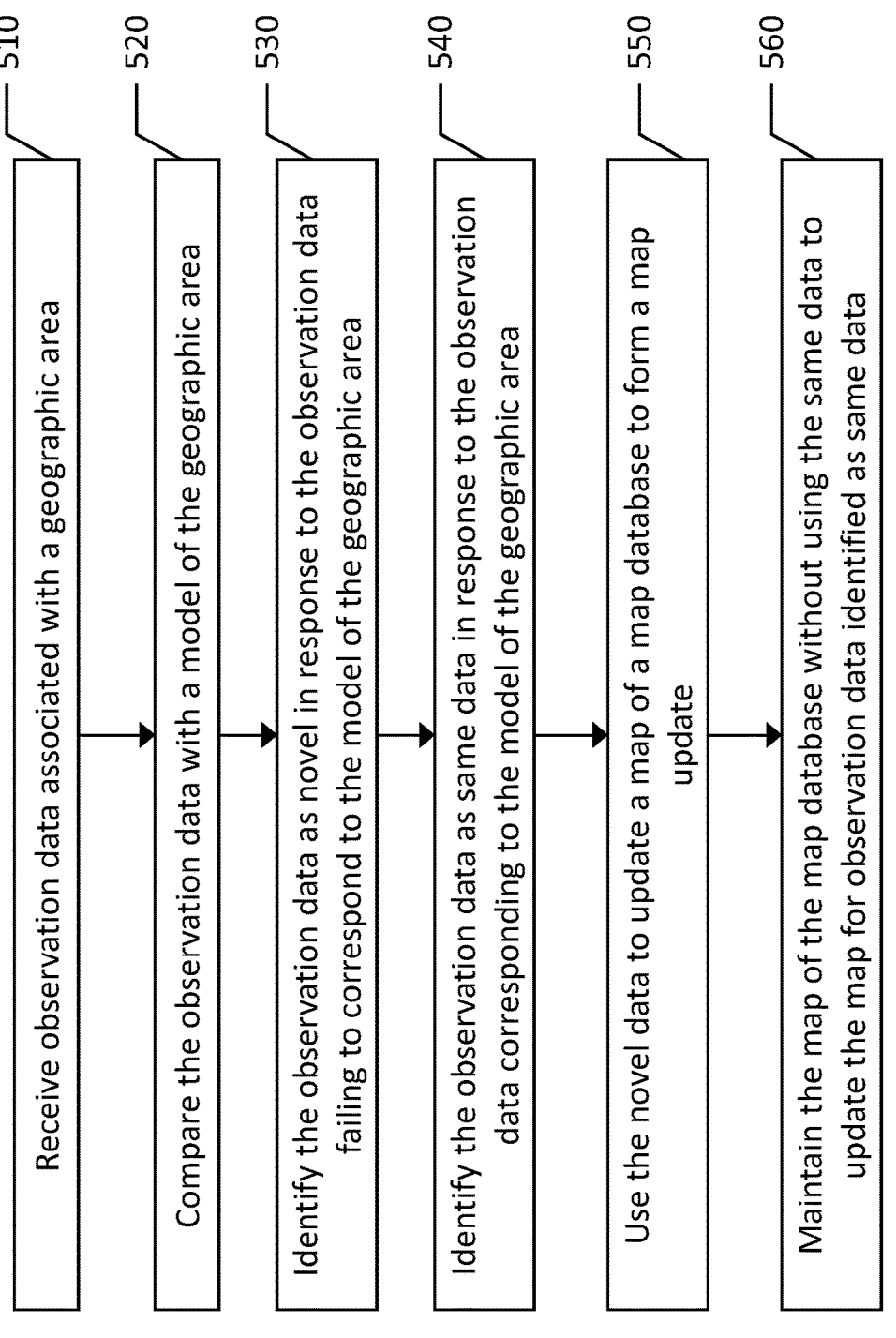

510 Receive observation data associated with a geographic area

520 Compare the observation data with a model of the geographic area

530 Identify the observation data as novel in response to the observation data failing to correspond to the model of the geographic area 540 Identify the observation data as same data in response to the observation data corresponding to the model of the geographic area 550 Use the novel data to update a map of a map database to form a map update 560 Maintain the map of the map database without using the same data to update the map for observation data identified as same data

FIG. 5

METHOD, APPARATUS, AND COMPUTER PROGRAM PRODUCT FOR SENSOR DATA ANALYSIS

TECHNOLOGICAL FIELD

An example embodiment of the present disclosure relates to analyzing sensor data to determine if the sensor data is consistent with a model or different from the model, and more particularly, to using sensor data that is consistent with the model to verify the model, and using sensor data that is different from the model to identify regions of the model requiring updates.

BACKGROUND

Maps have been used for centuries for providing route geometry and geographical information. Conventional paper maps including static images of roadways and geographic features from a snapshot in history have given way to digital maps used by and presented on computers, mobile devices, vehicles, etc. These digital maps can be updated and revised such that users have the most-current maps available to them each time they view a map hosted by a mapping service server. Digital maps can further be enhanced with dynamic information, such as traffic information in real time along roads and through intersections.

As digital maps, including high-definition (HD) digital maps with rich content can span entire continents, these digital maps include vast amounts of information, which can be corrupted through missing or erroneous data such as missing or erroneous lane geometry and objects, such as signs, poles, etc. Incorrect lane geometry information can be problematic as such lane geometry may be used for route guidance and at least semi-autonomous vehicle control. Inaccurate lane geometries can reduce the effectiveness of route guidance and vehicle autonomy. Inaccurate objects can be problematic as they can be used for refining location, identifying rules and restrictions, and to help guide autonomous vehicles. Conversely, correct map data benefits from being reinforced as correct to improve confidence in the map data. The accuracy of map data including point map features and objects is important for highly automated vehicles and map data needs to be kept current.

BRIEF SUMMARY

A method, apparatus, and computer program product are provided in accordance with an example embodiment for analyzing sensor data to determine if the sensor data is consistent with a model or different from the model, and more particularly, to using sensor data that is consistent with the model to verify the model, and using sensor data that is different from the model to identify regions of the model requiring updates. Embodiments provided herein include an apparatus having at least one processor and at least one memory including computer program code with the at least one memory and computer program code being configured to, with the processor, cause the apparatus to: receive observation data associated with a geographic area; compare the observation data with a model of the geographic area; in response to the observation data failing to correspond with the model of the geographic area, identify the observation data as novel data; in response to the observation data corresponding to the model of the geographic area, identify the observation data as same data; use the novel data to update a map of a map database to form an updated map; and for observation data identified as same data, maintain the map of the map database without using the same data to update the map.

The apparatus of an example embodiment is further caused to provide for at least one of semi-autonomous vehicle control or navigational guidance using the updated map. According to some embodiments, a false positive observation in the observation data is considered same data in response to the false positive observation being present in the model of the geographic area and not present in the map database. According to some embodiments, the model of the geographic area does not correspond with the map of the map database. The apparatus of an example embodiment is further caused to: aggregate the novel data with prior novel data to form aggregated novel data; and update the map of the map database in response to the aggregated novel data satisfying a predetermined threshold. The predetermined threshold of an example embodiment includes a predetermined volume of the aggregated novel data including a specific map data update. The predetermined threshold of another example embodiment includes a confidence level of a change to the map data found in the aggregated novel data.

Embodiments provided herein include a method including: receiving observation data associated with a geographic area; comparing the observation data with a model of the geographic area; in response to the observation data failing to correspond to the model of the geographic area, identifying the observation data as novel data; in response to the observation data corresponding to the model of the geographic area, identifying the observation data as same data; using the novel data to update a map of a map database to form an updated map; and for observation data identified as same data, maintaining the map of the map database without using the same data to update the map.

According to an example embodiment, the method further includes providing for at least one of semi-autonomous vehicle control or navigational guidance using the updated map. According to some embodiments, a false positive observation in the observation data is considered same data in response to the false positive observation being present in the model of the geographic area and not present in the map database. According to certain embodiments, the model of the geographic area does not correspond with the map of the map database.

According to some embodiments, the method further includes aggregating the novel data with prior novel data to form aggregated novel data; and updating the map of the map database in response to the aggregated novel data satisfying a predetermined threshold. The predetermined threshold of an example embodiment includes a predetermined volume of the aggregated novel data including a specific map data update. According to some embodiments, the predetermined threshold includes a confidence level of a change to the map data found in the aggregated novel data.

Embodiments described herein further include a computer program product including at least one non-transitory computer-readable storage medium having computer-executable program code instructions stored therein, the computer-executable program code instructions including program code instructions to: receive observation data associated with a geographic area; compare the observation data with a model of the geographic area; in response to the observation data failing to correspond to the model of the geographic area, identify the observation data as novel data; in response to the observation data corresponding to the model of the geographic area, identify the observation data as same data; use the novel data to update a map of a map database to form an updated map; and for observation data identified as same data, maintain the map of the map database without using the same data to update the map.

According to an example embodiment, the computer program product further includes program code instructions to provide for at least one of semi-autonomous vehicle control or navigational guidance using the updated map. According to some embodiments, a false positive observation in the observation data is considered same data in response to the false positive observation being present in the model of the geographic area and not present in the map database. According to certain embodiments, the model of the geographic area does not correspond with the map of the map database. According to some embodiments, the computer program product further includes program code instructions to: aggregate the novel data with prior novel data to form aggregated novel data; and update the map of the map database in response to the aggregated novel data satisfying a predetermined threshold. The predetermined threshold of an example embodiment includes a predetermined volume of the aggregated novel data including a specific map data update.

Embodiments provided herein include an apparatus including: means for receiving observation data associated with a geographic area; means for comparing the observation data with a model of the geographic area; in response to the observation data failing to correspond to the model of the geographic area, means for identifying the observation data as novel data; in response to the observation data corresponding to the model of the geographic area, means for identifying the observation data as same data; means for using the novel data to update a map of a map database to form an updated map; and for observation data identified as same data, means for maintaining the map of the map database without using the same data to update the map.

According to an example embodiment, the apparatus further includes means for providing for at least one of semi-autonomous vehicle control or navigational guidance using the updated map. According to some embodiments, a false positive observation in the observation data is considered same data in response to the false positive observation being present in the model of the geographic area and not present in the map database. According to certain embodiments, the model of the geographic area does not correspond with the map of the map database.

According to some embodiments, the apparatus further includes means for aggregating the novel data with prior novel data to form aggregated novel data; and means for updating the map of the map database in response to the aggregated novel data satisfying a predetermined threshold. The predetermined threshold of an example embodiment includes a predetermined volume of the aggregated novel data including a specific map data update. According to some embodiments, the predetermined threshold includes a confidence level of a change to the map data found in the aggregated novel data.

BRIEF DESCRIPTION OF THE DRAWINGS

Figure 1:
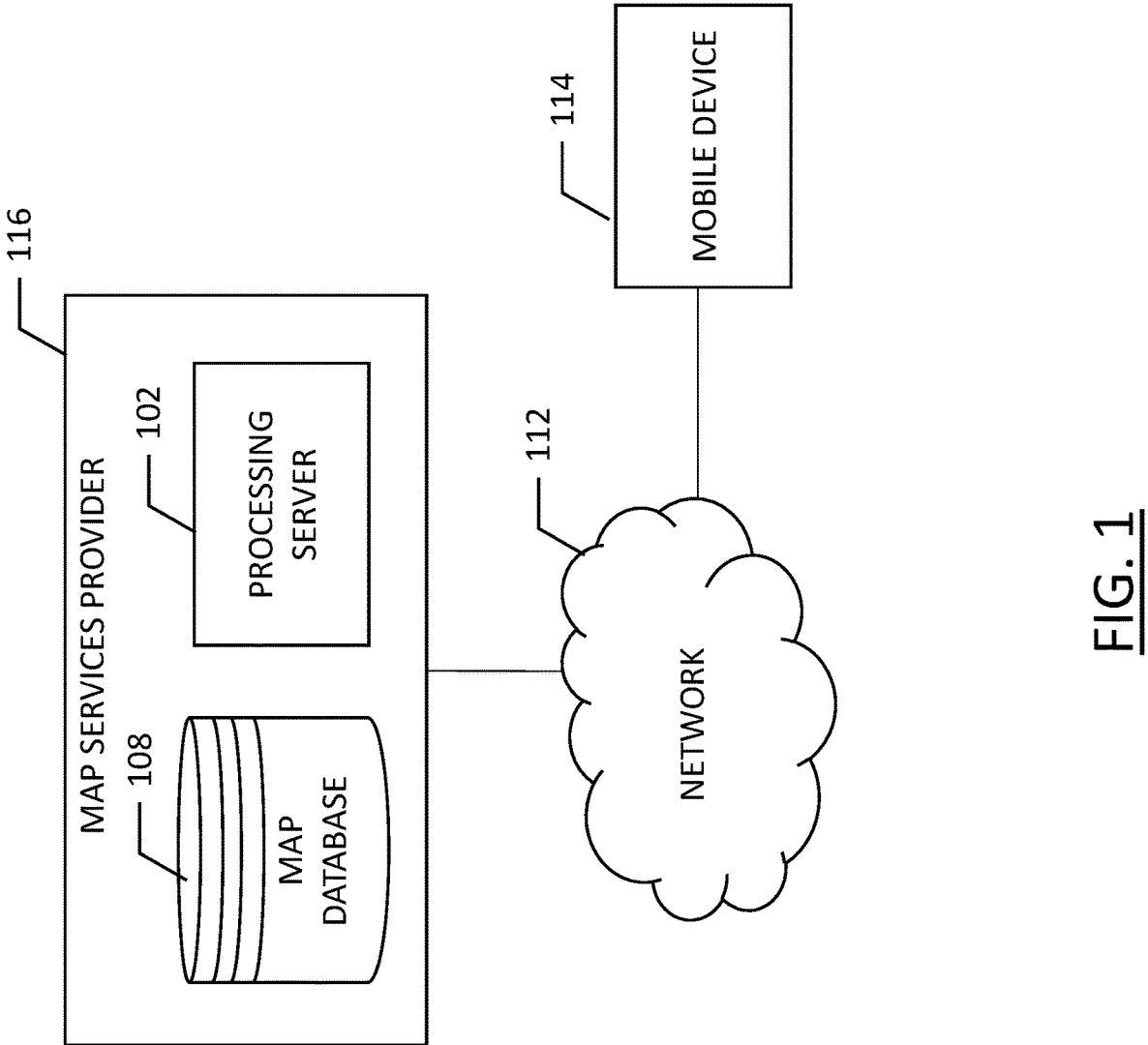
Figure 2:
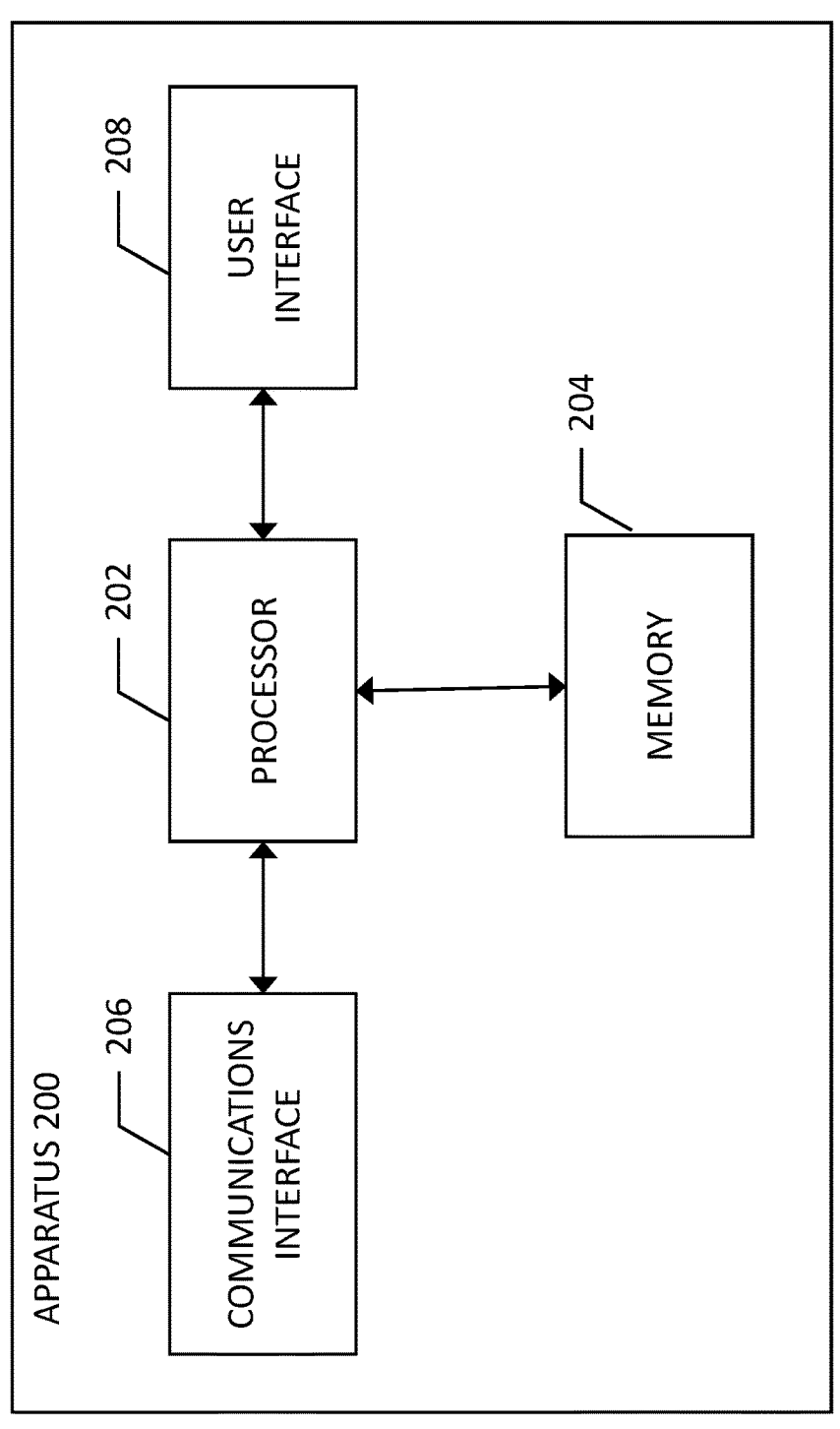
Figure 3:
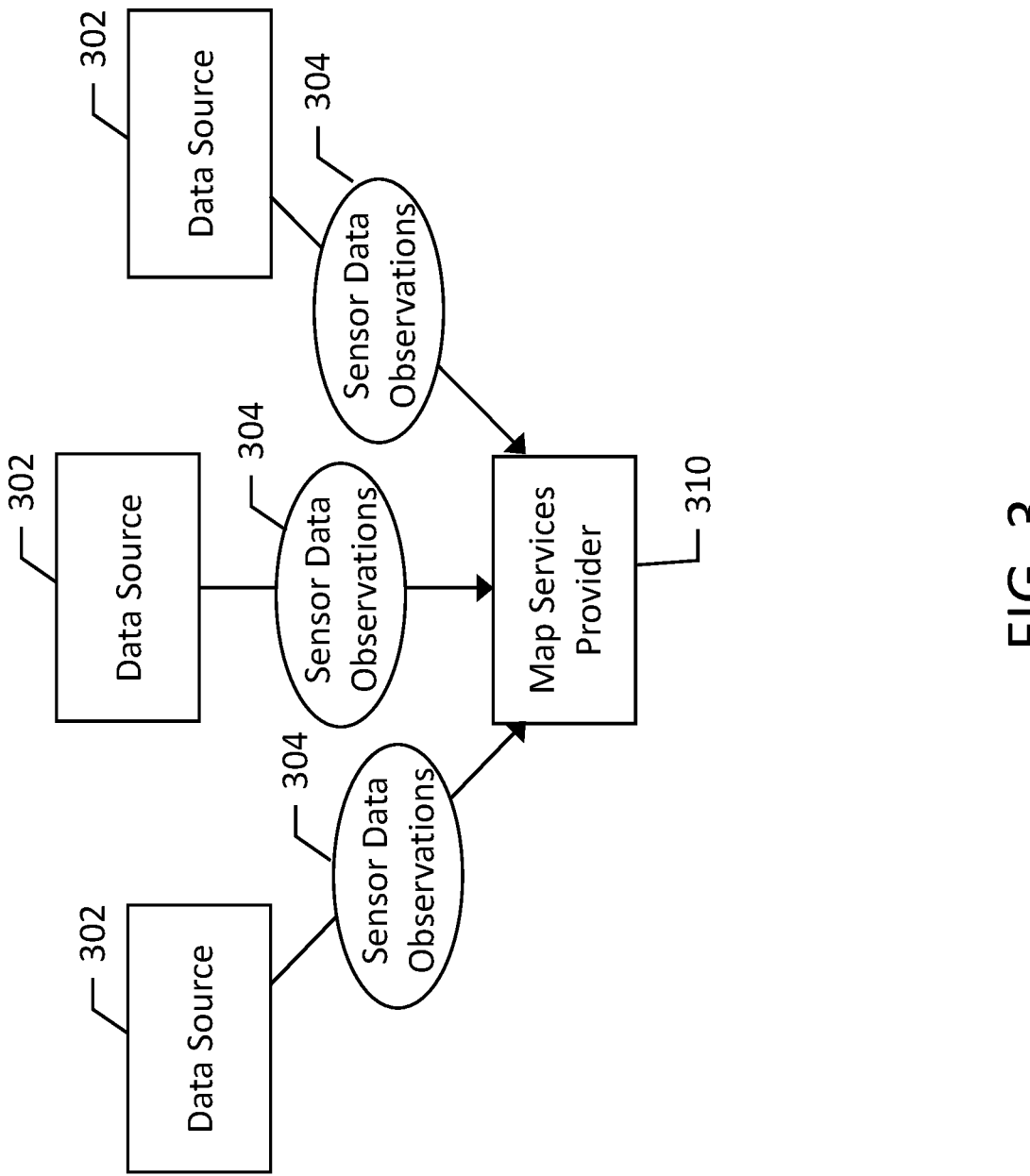
Figure 4:
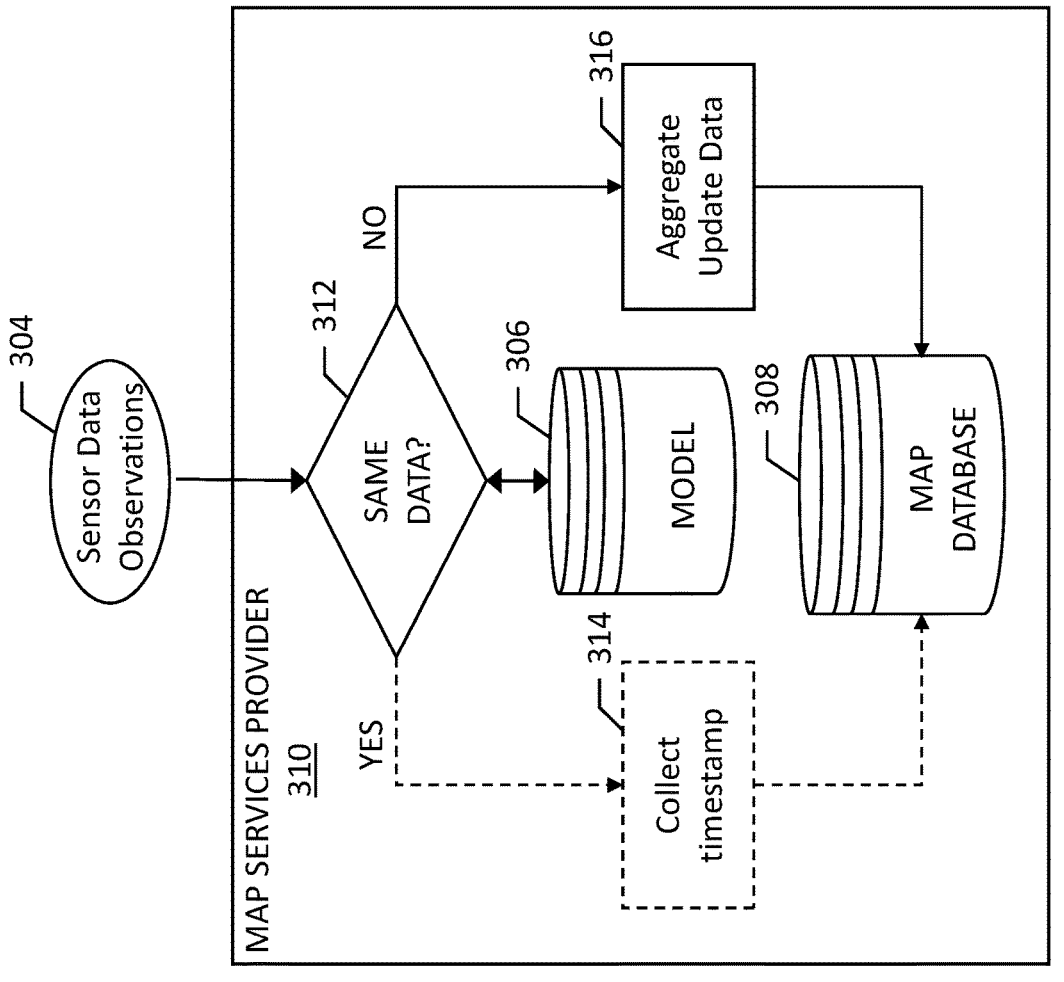

Having thus described example embodiments of the disclosure in general terms, reference will now be made to the accompanying drawings, which are not necessarily drawn to scale, and wherein:

FIG. 1 illustrates a communication diagram of a system for implementing example embodiments described herein according to an example embodiment of the present disclosure;

FIG. 2 is a block diagram of an apparatus for processing data from a variety of sources according to an example embodiment of the present disclosure;

FIG. 3 illustrates aggregation of data from a variety of data sources according to an example embodiment of the present disclosure;

FIG. 4 illustrates a block diagram of the processing of sensor data according to an example embodiment of the present disclosure; and FIG. 5 is a flowchart of a method of discerning same data and novel data from observation data according to an example embodiment of the present disclosure.

DETAILED DESCRIPTION

Example embodiments of the present disclosure will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

A system, method, apparatus, and computer program product are provided herein in accordance with an example embodiment for analyzing sensor data to determine if the sensor data is consistent with a model or different from the model, and more particularly, to using sensor data that is consistent with the model to verify the model, and using sensor data that is different from the model to identify regions of the model requiring updates.

Road segment paths, lane line geometry, and object presence/identification are often generated through automated means. Sensor data is collected from a variety of sources and used to generate, build, and heal map data in addition to confirming existing map data. As sensor technology advances, and as vehicles equipped with highly-capable sensor arrays become more ubiquitous, the volume of sensor data available becomes daunting. While a large volume of available sensor data is desirable, the ability to process this large volume of data becomes challenging. Embodiments of the present disclosure function as a preliminary processing operation to improve the efficiency with which sensor data is processed. Sensor data from an environment, regardless of source, comes in two categories: sensor data that matches or is the same as a model of an environment, and sensor data that is different from the model. Sensor data that is the same can be used for light processing, where the data is used for temporal decay and does not need to be used to build or heal an underlying map of the environment. Conversely, sensor data that is different from the model may require more in-depth processing to establish a change in the environment that requires an update to the underlying map.

Because millions of miles of roads exist, and sensor data from vehicles traveling these roads is becoming more prevalent, the volume of sensor data available is growing exponentially. Embodiments described herein provide an efficient method of processing sensor data that utilizes the large volume of sensor data available, while parsing the sensor data to use only what is necessary for maintaining a reliable map. Sensor data may come from various sources in various formats. The observations or gathered data (e.g., crowd-sourced) can be represented in formats such as images, point clouds, extracted analytical geometries, or probe densities that could be overlapping in terms of coverage.

An example data source includes sensor data gathered as probe data from a device traveling within an environment. The device can be a mobile device such as a phone, navigation device, or the like, but is often a vehicle such as an autonomous or semi-autonomous vehicle equipped with sensors to sense features of an environment through which the vehicle passes. The probe data can include various aspects of geometry of an environment such as road segment paths, lane line geometry, object detection, traffic determination, and the like. Another data source can include satellite imagery, where object detection is performed within the images to identify objects and their respective locations. Lane geometry and lane features (e.g., lane lines, lane boundaries, curbing, etc.) can also be identified in imagery. The different sources of map data have differing degrees of accuracy and timeliness. For example, map data informed by municipalities, such as a department of transportation, may be updated only periodically, such as quarterly. However, crowd-sourced data may be available in real-time or near real-time. Map data service providers may collect map data using specialized vehicles that have a high level of sensor technology, such that these specialized vehicles may provide substantially ground truth data that is interpreted as the most accurate data available. Early, semi-autonomous vehicles that gather point cloud data such as through LiDAR (light distancing and ranging) may be received in near real-time; however, the data may be of limited accuracy due to the age of the technology or the sensor level of the vehicle.

As technology advances, the data available for collection has increased in volume, such as with location data from personal hand-held devices and vehicles. Further, data from sensors attached to located vehicles (e.g., image sensors, LiDAR, etc.) and satellite imagery further enhances location data. The available data includes vast amounts of useful information, some of which is time sensitive. For example, traffic jams caused by accidents may be resolved after one hour, but within that one hour the information about the accident and the traffic jam is very valuable and informative to others traveling near the location of the accident. To harness the power of this huge volume of data in a timely fashion, it is beneficial to be able to process the data in an automatic fashion, eliminating or minimizing human interventions that are typically expensive and time consuming. Further, identifying which sensor data is useful and a degree to which the sensor data is useful can greatly improve the efficiency with which the sensor data is processed.

Generating map data such as road or lane geometries, map objects, and dynamic information such as traffic directly from probe data is challenging. Probe data refers to any data containing a location (e.g., longitude and latitude, such as Global Positioning System coordinates or GNSS coordinates, cartesian coordinates, etc.) collected by devices while moving within an environment. Such devices can include mobile devices (e.g., cell phones), vehicles (e.g., navigation systems), or the like. Such data often includes trajectories, each recording a trip made by a device or vehicle with timestamps associating location coordinates with a time at the location. Location data from vehicles, either collected from the vehicles or from mobile devices traveling within the vehicles, generally includes location data reflecting the path of underlying roads and lanes thereof, and likely real time information (e.g., traffic) that are not yet reflected anywhere. Extracting the underlying map from a large collection of such data is challenging.

The collection of rich sensor data from vehicles traveling within a road network, such as image data (e.g., 360-degree camera views) and LiDAR (Light Distancing and Ranging) requires sensor arrays associated with vehicles traveling within a road network. Such technology is being adopted at an ever-increasing rate, such that the volume of sensor data available is quickly growing. Processing this volume of data is challenging and can be costly. Embodiments described herein provide a preliminary processing operation that determines the usefulness of incoming sensor data, and processes the data according to its usefulness thereby pruning the volume of data processed to improve efficiency and reduce processing costs.

FIG. 1 illustrates a communication diagram of an example embodiment of a system for implementing example embodiments described herein. The illustrated embodiment of FIG. 1 includes a map services provider 116, a processing server 102 in data communication with a geographic map database, e.g., map database 108 through a network 112, and one or more mobile devices 114. The mobile device 114 may be associated, coupled, or otherwise integrated with a vehicle, such as an advanced driver assistance system (ADAS), for example. Additional, different, or fewer components may be provided. For example, many mobile devices 114 may connect with the network 112. The map services provider 116 may include computer systems and a network of a system operator. The processing server 102 may include the map database 108, such as provided by a remote map server. The network may be wired, wireless, or any combination of wired and wireless communication networks, such as cellular, Wi-Fi, internet, local area networks, or the like.

An ADAS may be used to improve the comfort, efficiency, safety, and overall satisfaction of driving. Examples of such advanced driver assistance systems include semi-autonomous driver assistance features such as adaptive headlight aiming, adaptive cruise control, lane departure warning and control, curve warning, speed limit notification, hazard warning, predictive cruise control, adaptive shift control, among others. Other examples of an ADAS may include provisions for fully autonomous control of a vehicle to drive the vehicle along a road network without requiring input from a driver. Some of these advanced driver assistance systems use a variety of sensor mechanisms in the vehicle to determine the current state of the vehicle and the current state of the roadway ahead of the vehicle. These sensor mechanisms may include radar, infrared, ultrasonic, and vision-oriented sensors such as image sensors and light distancing and ranging (LiDAR) sensors.

Some advanced driver assistance systems may employ digital map data. Such systems may be referred to as map-enhanced ADAS. The digital map data can be used in advanced driver assistance systems to provide information about the road network, road geometry, road conditions, and other information associated with the road and environment around the vehicle. Unlike some sensors, the digital map data is not affected by the environmental conditions such as fog, rain, or snow. Additionally, the digital map data can provide useful information that cannot reliably be provided by sensors, such as curvature, grade, bank, speed limits that are not indicated by signage, lane restrictions, and so on. Further, digital map data can provide a predictive capability well beyond the driver's vision to determine the road ahead of the vehicle, around corners, over hills, or beyond obstructions. Accordingly, the digital map data can be a useful and sometimes necessary addition for some advanced driving assistance systems. In the example embodiment of a fully-autonomous vehicle, the ADAS uses the digital map data to determine a path along the road network to drive, such that accurate representations of the road are necessary, such as accurate representations of intersections and turn paths there through. Thus, it is important to have continuous features remain continuous within the map data as provided by embodiments herein.

The map database 108 may include node data, road segment data or link data, point of interest (POI) data, or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) associated with the POI data records or other records of the map database 108.

The map database 108 may be maintained by a content provider e.g., a map services provider in association with a services platform. By way of example, the map services provider can collect geographic data to generate and enhance the map database 108. There can be different ways used by the map services provider to collect data. These ways can include obtaining data from other sources, such as municipalities or respective geographic authorities. In addition, the map services provider can employ field personnel to travel by vehicle along roads throughout the geographic region to observe features and/or record information about them, for example. Additional data sources can include OEM vehicles that may provide camera images, camera detections, radar information, LiDAR information, ultrasound information, and/or other sensing technologies. Also, remote sensing, such as aerial or satellite photography, can be used to generate map objects directly or through machine learning as described herein. The map database 108 may include the digital map data for a geographic region or for an entire mapped space, such as for one or more countries, one or more continents, etc. The map database 108 may partition the mapped space using spatial partitions to segment the space into map tiles that are more manageable than the entire mapped space.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems including in conjunction with autonomous and semi-autonomous navigation systems.

For example, geographic data may be compiled (such as into a platform specification format (PSF)) to organize and/or configure the data for performing navigation-related functions and/or services, such as route calculation, route guidance, map display, speed calculation, distance and travel time functions, and other functions, by a navigation device, such as by mobile device 114, for example. The navigation-related functions can correspond to vehicle navigation, pedestrian navigation, or other types of navigation. The compilation to produce the end user databases can be performed by a party or entity separate from the map services provider. For example, a customer of the map services provider, such as a navigation services provider or other end user device developer, can perform compilation on a received map database in a delivery format to produce one or more compiled navigation databases.

As mentioned above, the server side map database 108 may be a master geographic database, but in alternate embodiments, a client side map database 108 may represent a compiled navigation database that may be used in or with end user devices (e.g., mobile device 114) to provide navigation and/or map-related functions. For example, the map database 108 may be used with the mobile device 114 to provide an end user with navigation features. In such a case, the map database 108 can be downloaded or stored on the end user device (mobile device 114) which can access the map database 108 through a wireless or wired connection, such as via a processing server 102 and/or the network 112, for example.

In certain embodiments, the end user device or mobile device 114 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. End user devices may optionally include automated computer systems, such as map data service provider systems and platforms as the map may be processed, utilized, or visualized via one or more other computing systems. An end user can use the mobile device 114 for navigation and map functions such as guidance and map display, for example, and for determination of one or more personalized routes or route segments based on one or more calculated and recorded routes, according to some example embodiments.

While the mobile device 114 may be used by an end-user for navigation, driver assistance, or various other features, the mobile device 114 may provide map data to the map services provider 116 for purposes of updating, building, restoring, or repairing the map database 108, for example. The processing server 102 may receive probe data from a mobile device 114. The mobile device 114 may include one or more detectors or sensors as a positioning system built or embedded into or within the interior of the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The processing server 102 may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle. This vehicle data, also referred to herein as "probe data", may be collected by any device capable of determining the necessary information, and providing the necessary information to a remote entity. The mobile device 114 is one example of a device that can function as a probe to collect probe data of a vehicle.

More specifically, probe data (e.g., collected by mobile device 114) is representative of the location of a vehicle at a respective point in time and may be collected while a vehicle is traveling along a route. The probe data may also include speed and direction in some embodiments, such as when probe data is used to facilitate vehicle traffic speed determination. While probe data is described herein as being vehicle probe data, example embodiments may be implemented with pedestrian probe data, marine vehicle probe data, or non-motorized vehicle probe data (e.g., from bicycles, skateboards, horseback, etc.). According to the example embodiment described below with the probe data being from motorized vehicles traveling along roadways, the probe data may include, without limitation, location data, (e.g. a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, or the like.

An example embodiment of a processing server 102 may be embodied in an apparatus as illustrated in FIG. 2. The apparatus, such as that shown in FIG. 2, may be specifically configured in accordance with an example embodiment of the present disclosure for revising map objects based on a detailed analysis of probe data and existing map objects. The apparatus may include or otherwise be in communication with a processor 202, a memory 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment of the present disclosure. For example, the memory device could be configured to buffer input data for processing by the processor. Additionally or alternatively, the memory device could be configured to store instructions for execution by the processor.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. Embodiments described herein can further employ a processer embodied by a Graphics Processing Unit (GPU) specifically configured for neural network implementations and/or image processing capitalizing on efficient processing capabilities using multiple parallel operations. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present disclosure by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more mobile devices 114 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may, in turn be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory 204, and/or the like).

Embodiments described herein analyze sensor data to determine if the sensor data is consistent with a model or different from the model, and more particularly, to using sensor data that is consistent with the model to verify the model, and using sensor data that is different from the model to identify regions of the model requiring updates. A model, as described herein, includes geographic data associated with an environment including object location and identification. Embodiments process sensor data in an efficient and effective manner to determine if the sensor data is the same as the model, or different from the model, and uses that determination for establishing how the sensor data will be used.

When creating and maintaining data products such as maps using real world detections, generally in the form of sensor data (e.g., OEM sensor data), a large volume of data is available. Most of the available data does not provide value to the system. The sensor data is useful for validating that the existing model is still accurate when the sensor data is the same as a model, and for collecting observations that disagree with the existing data model. Same data may be used to update metadata, such as observation timestamps which can be used in decay models to estimate attribute quality between observation times. Sensor data that is not the same as the data model can be accumulated and used to build areas of interest for map maintenance and efficiently used to select only the data needed to update the map. Further, when false positive observations are included in the data model, same data detection can filter them as naturally and efficiently as true positives, which further improves the efficiency of embodiments described herein.

Embodiments of the present disclosure employ a model of features and objects of an environment as a pre-screening stage in comparing received sensor data to establish if the sensor data is consistent with the model (same data) or distinct from the model (novel data). The model is a high-level representation of the environment and is not the same as the underlying map that is used as the deliverable for use by location-based service providers and clients. The model maintains a representation of the objects identified in the environment through sensor data, even to include falsely-identified objects or false-positives as further detailed below.

Incoming sensor data is compared to an existing model of a corresponding geographic area. If the incoming sensor data corresponds or matches with the model, the same data may be verified and ignored for further processing while sensor data that do not match the model may be used to update the model, and may be accumulated to build an area of interest for map maintenance. Based on reliability measures of features and attributes from various sources, an estimate of novelty of the not-same data may be derived in that can be used to determine areas of interest for map maintenance. The model of observations to which the sensor data is compared includes false positives such that future false positives will naturally be filtered as uninteresting by the same-detection or similar difference-measuring schemes.

As noted above, copious amounts of sensor data from millions of miles of roads are gathered daily by sensor-equipped devices as they traverse road networks. It is unfeasible to use all of this data to update underlying maps of the road networks. Embodiments of the present disclosure serve to filter the sensor data to identify that which is new information different from a data model and useful for updating the model and a map, and that which is same data, consistent with the data model, which is not needed for map updates.

Embodiments of the present disclosure focus on same detection, which is the identification of data that is the same as a data model or similar to within a predetermined degree. While change detection attempts to identify differences in datasets, embodiments described herein focus on that which is the same or similar. Automated map building and healing systems are complex and expensive to operate. After enough data is ingested to create a model of reality in the form of a map, additional data has diminished value and may even be detrimental to the map quality and can add unnecessary cost. Embodiments filter data that matches the model reality as early as possible such that data that may add value to an underlying map is isolated. By associating incoming sensor data to the model, one can estimate how much of the incoming data matches the model. Associating the incoming sensor data includes finding correspondences between incoming features and the map or model as a prior.

Trajectory or drive data is a sequence of observations over time, where portions of incoming data may be identified as similar to the model, while other portions may be identified as novel. Same detection focuses on areas covered by the incoming sensor data that match an existing model while not being concerned about elements in the model that are not present in the incoming data. For example, an object in the model not found in sensor data received does not render the sensor data novel within the logic of same detection. This is a clear distinction from change detection that looks to any differences between sensor data and the underlying model.

Embodiments employing same detection as described herein provide an efficient map maintenance system that can crop or select subsections of incoming data that are novel along with some margin or context that matches the model to stitch or join the incoming data to the model. In this manner entire portions of incoming data may be trivially rejected saving storage, processing, and in some cases communication cost while maintaining optimal quality.

FIG. 3 illustrates an example embodiment of sensor data collection from a plurality of data sources 304. The data from the data source is sensor data, and may be provided by the device generating the sensor data (e.g., a mobile device, vehicle, etc.), or may be provided by a data aggregator, such as an OEM that collects sensor data from vehicles employing the OEM software and/or hardware. For example, an OEM may be a vehicle manufacturer, a navigation system manufacturer/provider, or sensor suite manufacturer/provider, etc. Regardless of the source, sensor data observations 304 are provided to a service provider such as the illustrated map services provider 310, which may correspond with map service provider 116 of FIG. 1.

FIG. 3 illustrates an example embodiment in which a continuous stream of new observations are received, such as from vehicles traveling within a road network, aerial images, stationary sensors, etc. The observations from the different data sources can be received, for example, by a map services provider 310 or other entity functioning to aggregate and compare the observation data together with prior state model data. These different sources of data provide observations that can include different information with different levels of detail regarding a given geographic area and different temporal significances, such as real-time or periodically (hourly, daily, monthly, quarterly, etc.).

Sensor data observations can include observations of objects within a geographic region. While sensor data can be a continuous stream of data from a trajectory, sensor data typically includes instances of discrete observations, particularly for discrete objects such as signs, poles, or other objects that have discrete locations. Observations that include continuous objects can include periodic observations of the continuation of the same object, such as lane lines, for example.

FIG. 4 illustrates the filtering process of example embodiments, where sensor data observations 304 received at a map services provider 310 are processed at 312 to determine if the sensor data observations are the same data as underlying map data or model data in model 306. If the data is the same, the sensor data observations can be discarded. However, the sensor data identified as the same may be beneficial for decay logic and may be beneficial to establish a time stamp where the same data is confirmed as consistent with the model data. In such an embodiment, a timestamp may be collected at 314 for the same data and provided to the map database 308. If the sensor data observations are not the same data at 312 as the underlying model or map, the sensor data observations can be aggregated at 316. The aggregation may consider, among other parameters, a reliability of the sensor data observations based on a source and weight the sensor data observations accordingly when determining an appropriate threshold beyond which a map update is triggered and the updated map data is provided to the map database 308.

Embodiments provided herein reduce the volume of data that requires processing thereby improving the efficiency of the map service provider through elimination of the need to process map data deemed redundant, while identifying map data that should be aggregated for updating of the map database. This improvement in efficiency is capable of handling the large volumes of data available while minimizing the processing capacity needed to use the available data for map updates. Using a model of the environment to detect observation data as same data or novel data is a high-level processing operation that does not require mapmatching or more complex processing as would be required in establishing the presence of changes to the environment within the map database 308. Thus, embodiments can more quickly identify data that is familiar or the same as the model 306, and data that is distinct from the model. This process enables relatively quick processing of observation data to determine which data is important for map updates, and which data can be discarded or otherwise used outside of map updates.

One particular benefit of example embodiments described herein is the ability to mitigate false positives through identification of false positives in the data model, and understanding the false positives as they arrive in new sensor data observations. If the false positive rates are known for each type of data in an incoming data source, after the same data detection has identified attributes that match the model, the likelihood of the remaining features that do not match the model are false positives (or conversely true positives) can be calculated for the entirety of the incoming data. This estimation may serve as a measure of novelty or value that may be used by automated systems to decide which data to incorporate. This estimation may be accumulated in the model over time to allow infrequent ingestion of data that substantially matches the model. This integration allows small or uncertain real world changes to accumulate weight to trigger processing while saving substantial cost at the expense of integration time/data.

An example of a false positive includes detecting an object in sensor data that is not present in the real world. A potential false positive includes cylindrical supports that support a roadway overpass, which may be commonly detected as signs given their shape and position along a roadway. A model may include the presence of these features and understand that they are false positives. When sensor data is received identifying one or more of these cylindrical supports as a sign, the sensor data is processed as with any other sensor data. The sensor data is compared against the model, and the model showing the cylindrical supports as signs recognizes the sensor data as "same data" and discards the observations. Meanwhile, the underlying map data is not updated by the model, as there is no novelty identified in the sensor data. Thus, the false positives are filtered out by the same data in the model.

By incorporating all observations from the various data sources into the data model including the false positives, the same data detection will trivially work to identify portions of incoming sensor data observations that match the aggregated result or the model. Conventional filtering of false positives attempts to eliminate false positives in the map generation and healing process; however, removal of false positive observations becomes a continuous problem for objects that are routinely identified erroneously as positives. These false positives identified and eliminated would continue indefinitely consuming added processing resources and operating inefficiently. According to embodiments described herein, false positives are identified, labeled, and/or filtered after the creation of the model. This is an advantage of the same detection operating against the model rather than the underlying map which is a delivered product that should not contain false positives.

Same detection does not determine what is true and what is false. Rather, same detection provides reliable signals. If false positives are eliminated in the data, every subsequent false positive object sensed would be deemed novel and fail to correspond with the model data, thereby proceeding to further processing through change data aggregation. Such processing becomes expensive and can be eliminated through same detection using the model described herein.

Referring back to FIG. 4, when sensor data observations 304 are received that are identified as being novel or distinct relative to the model at 312, the data is aggregated at 316. The source of the sensor data observations can be considered in establishing a reliability of the novelty of the observations. For example, an older vehicle with a low-level of sensor capabilities may have a relatively low confidence as such observations may be less likely to be accurate. Conversely, sensor data observations received from specifically-deployed vehicles that are able to establish ground truth may be deemed highly reliable and given substantially more weight. Beyond sensor capability of a vehicle, context of the sensor data can be considered. For instance, sensor data collected during rain or snow may be given a lower weight as it is more likely to be inaccurate. Similarly, sensor data collected in the form of images at night may be deemed of lower accuracy and given lower weight. The aggregation of sensor data observations can gather sensor data observations pertaining to a specific change in the model, and upon reaching a threshold confidence of an actual change in the ground truth being present, update the map database 308 accordingly.

Optionally, sensor data may be aggregated for a region, with different changes identified within that region, and the aggregation can continue until a threshold volume of changes to the region with at least a minimum confidence level to update that particular region of the map in the map database 308. Changes to the map database from the aggregated sensor data can include the novel data together with context or a margin about the novel data. Changes to the map data are inherently different from the map data, such that context or a margin about the changed data is used to properly locate the changed data within the map data.

Embodiments described herein function to filter sensor data in a manner that reduces processing requirements and improves the efficiency of map generation and healing through limiting the volume of data used to update and generate map data. Embodiments receive data from various sources and establish if the sensor data is the same as a model, which is distinct from the underlying map data. Data that is the same can be used for decay logic together with a timestamp of the data observation, or used to note the freshness of the model. Data that is different from the underlying data is aggregated to arrive at updated map content in a consistent and automatic manner. The output is map data with an estimate of the map objects and the true object position within the map geometry. A map data update can be triggered by a predetermined threshold, such as enough observations aggregated in the aggregated update data 316 of FIG. 4 sufficient to trigger a map update may be dependent upon characteristics of the different data sources, such as the reliability or weight of the data source. Further, the map updates can be updated in cycles, which may be based on drives. When a sufficient number of drives are available (e.g., for a road segment or a geographic region) the update process may be triggered. Embodiments may be further tuned to support a freshness requirement of the map product such that an update could be triggered by any frequency needed to maintain the freshness requirement.

FIG. 5 illustrates a flowchart depicting methods according to example embodiments of the present disclosure. It will be understood that each block of the flowchart and combination of blocks in the flowchart may be implemented by various means, such as hardware, firmware, processor, circuitry, and/or other communication devices associated with execu-tion of software including one or more computer program instructions. For example, one or more of the procedures described above may be embodied by computer program instructions. In this regard, the computer program instructions which embody the procedures described above may be stored by a memory 204 of an apparatus employing an embodiment of the present disclosure and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions that execute on the computer or other programmable apparatus provide operations for implementing the functions specified in the flowchart blocks.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems that perform the specified functions, or combinations of special purpose hardware and computer instructions.

An operation of an example apparatus will herein be described with reference to the flow chart of FIG. 5. The illustrated method may be performed, for example, by apparatus 200 using processor 202 with program code instructions stored in memory 204 to cause the apparatus to perform the operations of the method of FIG. 5. As shown at 510, apparatus is caused to receive observation data associated with a geographic area. The observation data is compared at 520 with a model of the geographic area. The observation data is identified as novel in response to the observation data failing to correspond to the model of the geographic area at 530. The observation data is identified as same data in response to the observation data corresponding to the model of the geographic area at 540. The novel data is used to update a map of a map database to form a map update at 550. At 560, the map of the map database is maintained without using the same data to update the map for observation data identified as same data.

In an example embodiment, an apparatus for performing the methods of FIG. 5 above may include a processor (e.g., the processor 202) configured to perform some or each of the operations (510-560) described above. The processor may, for example, be configured to perform the operations (510-560) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 510-560 may comprise, for example, the processor 202 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one memory including computer program code, the at least one memory and computer program code configured to, with the processor, cause the apparatus to at least:

receive observation data associated with a geographic area;

compare the observation data with a model of the geographic area, wherein the model comprises a representation of objects identified in the geographic area;

in response to the observation data failing to correspond to the model of the geographic area, identify the observation data as novel data;

in response to the observation data corresponding to the model of the geographic area, identify the observation data as same data;

use the novel data to update a map of a map database of the geographic area to form an updated map, wherein the model of the geographic area does not correspond with the map of the map database of the geographic area;

for observation data identified as same data, update observation timestamps of model data corresponding to the observation data and estimate attribute quality of model data between observation times using a decay model without using the same data to update the map of the map database; and provide for semi-autonomous vehicle control using the updated map.

2. The apparatus of claim 1, wherein a false positive observation in the observation data is considered same data in response to the false positive observation being present in the model of the geographic area and not present in the map database.

3. The apparatus of claim 1, wherein the apparatus is further caused to:

aggregate the novel data with prior novel data to form aggregated novel data; and update the map of the map database in response to the aggregated novel data satisfying a predetermined threshold.

4. The apparatus of claim 3, wherein the predetermined threshold comprises a predetermined volume of the aggregated novel data comprising a specific map data update.

5. The apparatus of claim 3, wherein the predetermined threshold comprises a confidence level of a change to map data found in the aggregated novel data.

6. A method comprising:

receiving observation data associated with a geographic area;

comparing the observation data with a model of the geographic area, wherein the model comprises a representation of objects identified in the geographic area;

in response to the observation data failing to correspond to the model of the geographic area, identifying the observation data as novel data;

in response to the observation data corresponding to the model of the geographic area, identifying the observation data as same data;

using the novel data to update a map of a map database of the geographic area to form an updated map, wherein the model of the geographic area does not correspond with the map of the map database of the geographic area;

for observation data identified as same data, updating observation timestamps of model data corresponding to the observation data and estimating attribute quality of model data between observation times using a decay model without using the same data to update the map of the map database; and providing for at least one of semi-autonomous vehicle control or navigational guidance using the updated map.

7. The method of claim 6, wherein a false positive observation in the observation data is considered same data in response to the false positive observation being present in the model of the geographic area and not present in the map database.

8. The method of claim 6, further comprising:

aggregating the novel data with prior novel data to form aggregated novel data; and updating the map of the map database in response to the aggregated novel data satisfying a predetermined threshold.

9. The method of claim 8, wherein the predetermined threshold comprises a predetermined volume of the aggregated novel data comprising a specific map data update.

10. The method of claim 8, wherein the predetermined threshold comprises a confidence level of a change to map data found in the aggregated novel data.

11. A computer program product comprising at least one non-transitory computer-readable storage medium having computer-executable program code instructions stored therein, the computer-executable program code instructions comprising program code instructions to:

receive observation data associated with a geographic area;

compare the observation data with a model of the geographic area, wherein the model comprises a representation of objects identified in the geographic area;

in response to the observation data failing to correspond to the model of the geographic area, identify the observation data as novel data;

in response to the observation data corresponding to the model of the geographic area, identify the observation data as same data;

use the novel data to update a map of a map database of the geographic area to form an updated map, wherein the model of the geographic area does not correspond with the map of the map database of the geographic area;

for observation data identified as same data, update observation timestamps of model data corresponding to the observation data and estimate attribute quality of model data between observation times using a decay model without using the same data to update the map of the map database; and provide for at least one of semi-autonomous vehicle control or navigational guidance using the updated map.

12. The computer program product of claim 11, wherein a false positive observation in the observation data is considered same data in response to the false positive observation being present in the model of the geographic area and not present in the map database.

13. The computer program product of claim 11, further comprising program code instructions to:

aggregate the novel data with prior novel data to form aggregated novel data; and update the map of the map database in response to the aggregated novel data satisfying a predetermined threshold.

14. The computer program product of claim 13, wherein the predetermined threshold comprises a predetermined volume of the aggregated novel data comprising a specific map data update.

15. The apparatus of claim 1, wherein the apparatus is further caused, in response to the observation data being identified as same data, to update metadata of the model to estimate attribute quality between observation times.

16. The apparatus of claim 1, wherein the model is a high-level representation of the geographic area and is not map data that is used by location-based service providers.

17. The apparatus of claim 1, further comprising, for observation data identified as same data, causing the apparatus to estimate attribute quality between observation timestamps.

18. The apparatus of claim 1, wherein the apparatus is further caused to at least semi-autonomously control a vehicle using the updated map.

19. The method of claim 6, further comprising at least semi-autonomously controlling a vehicle using the updated map.

20. The computer program product of claim 11, further comprising program code instructions to at least semi-autonomously control a vehicle using the updated map.

* * * * *